Jan. 23, 1951     O. S. FRENCH     2,539,186
JOINT ASSEMBLY
Filed July 27, 1948
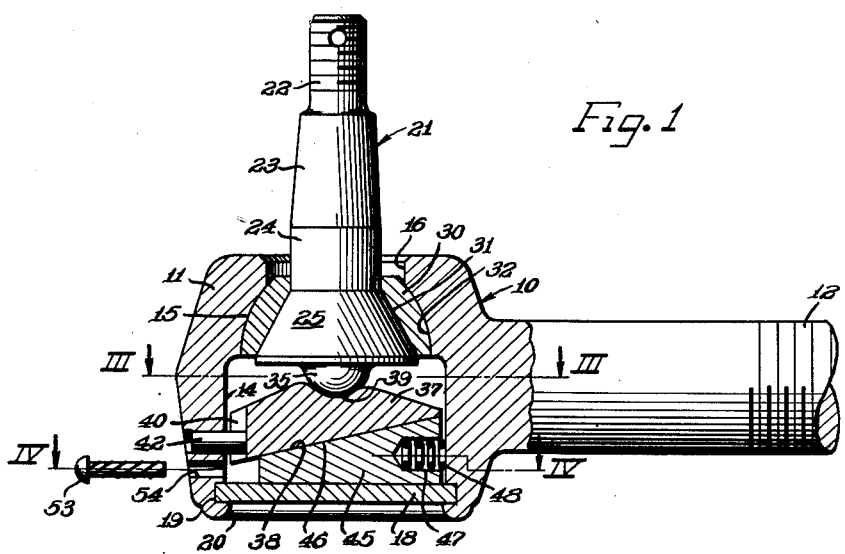
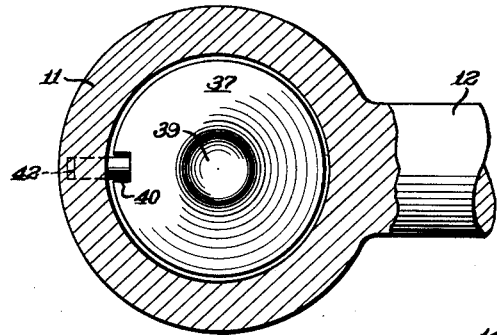
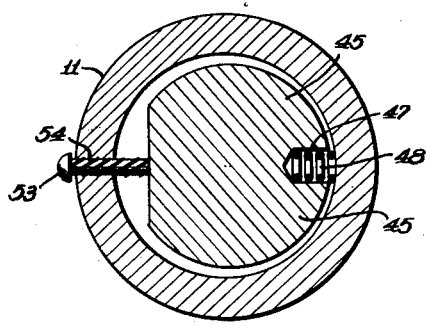
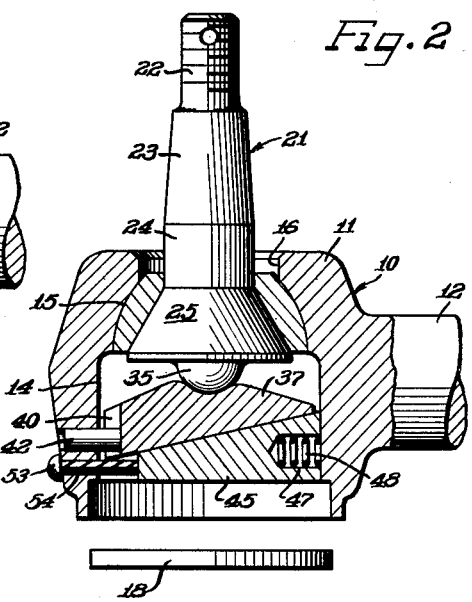
Inventor
Oliver S. French Patented Jan. 23, 1951

2,539,186

UNITED STATES PATENT OFFICE 2,539,186

JOINT ASSEMBLY

Oliver S. French, Detroit, Mich., assignor to Thompson Products, Inc., Cleveland, Ohio, a corporation of Ohio Application July 27, 1948, Serial No. 40,870

3 Claims. (Cl. 287—90)

This invention relates to improvements in joint assemblies. More particularly this invention deals with a joint assembly having means associated with the bearing members for automatically compensating for wear thereof.

The invention will hereinafter be specifically described as embodied in a tie rod joint, but it should be understood, of course, that the principles of this invention are applicable to joints in general and the invention is not limited to the specifically described embodiment.

According to this invention a tie rod socket or end receives a bearing ring having a segmental spherical outer bearing surface in engagement with a similar surface on the interior of the socket and an internal frusto-conical surface which is arranged to receive in bearing relation the frusto-conical end of a stud. The stud is thus arranged for rotating movement relative to the bearing ring and for pivoting movement with the bearing ring relative to the socket. A pair of oppositely disposed wedge members are assembled with their slanted surfaces in contact in the socket below the end of the stud, the distance between the lower end of the ball stud and a closure plate at the bottom end of the socket being such that there is provided only enough room for the wedges at their minimum height measured in the direction of the axis of the stud. A small spring is fitted into a side marginal portion of the lower wedge and is compressed against the wall of the socket when the wedges are assembled in their minimum-height relation. Thus, as wear occurs in the working parts of the socket, the spring will tend to force the lower wedge in a direction away from the side wall of the casing thus forcing the upper wedge tightly against the lower part of the stud and maintaining snugness within the socket. The upper wedge is provided with an axially extending slot into which is disposed a pin which is pressed at one end in the socket. This pin therefore maintains the alignment of the upper wedge relative to the lower wedge and to the socket.

It is then an object of this invention to provide a joint assembly having means for automatically compensating for wear in the working parts of the socket.

Another object of this invention is to provide a joint assembly wherein a frusto-conical end portion of a stud is rotatably mounted in a bearing ring which is disposed for pivoting relative to the socket and having spring urged wedge members operable against the end of the stud to maintain the bearing surfaces in bearing contact.

A further object of this invention is to provide in a joint assembly, a wedge means associated with the end of the stud and means for mounting the wedge in the socket in a preloaded condition so that the wedge will automatically urge the bearing surfaces of the socket into engagement to compensate for wear.

Other objects, features, and advantages of the present invention will be apparent to those skilled in the art from the following detail description of the annexed sheets of drawings, which, by way of a preferred example only, illustrate one embodiment of the invention.

On the drawings:

Figure 1 is a side elevational view, with parts in vertical cross section, of a ball and socket tie rod joint according to this invention;

Figure 2 is a view similar to Figure 1 but illustrating the bottom closure plate of the socket removed therefrom and the wedge members in their minimum height relation;

Figure 3 is a fragmentary horizontal sectional view partly broken away taken on line III—III of Figure 1; and Figure 4 is a horizontal sectional view taken substantially on line IV—IV of Figure 1.

As shown on the drawings:

In Figures 1 and 2 the reference numeral 10 designates a tie rod and composed of a housing 11 having a laterally extending externally threaded stem 12 for insertion in a tie rod, drag link, or the like (not shown).

The housing 11 has a substantially cylindrical bore 14 provided near the top thereof with a segmental spherical bearing surface 15 terminating in an annular opening 16 giving entrance to the housing. The other end of the housing 10 is closed by a plate 18 seated in a groove 19 formed within the housing wall. The plate 18 is held in position by peening or spinning over the ends of the housing 10, as indicated at 20.

A joint stud 21 having a threaded top portion 22, an intermediate tapered portion 23, a cylindrical portion 24 below the tapered portion, and an enlarged bottom portion 25 formed with a frusto-conical surface portion, extends upwardly through the opening 16 with the frusto-conical portion disposed in a bearing ring 30 which has a substantially frusto-conical inner bearing surface 31 mating with the bearing surface of the frusto-conical end 25 of the stud and an outer segmental spherical bearing surface 32 pivotally mounted in the segmental bearing surface 15 of the casing 11. Thus, the stud is mounted for rotation on the mating frusto-conical bearing surfaces and pivoting movement with the ring 30 on the mating segmental spherical bearing surfaces 15 and 32.

A semi-ball end or button 35 is provided at the lower end of the stud 21. The center of this semi-ball end or button 35 is the pivoting center about which the stud 21 and the bearing ring 30 pivots.

Disposed in the cylindrical cavity 14 of the socket 11 is a wedge member 37, Figures 1 and 3, having a substantially circular contour in plan and a wedge-like configuration in elevation, with an upwardly slanted contact surface 38. A central indentation 39 of segmental circular contour is provided in the surface of the wedge-like member 37 opposite to the slanted surface 38. This indentation 39 is made of a curvature adapted to receive in close fitting pivoting relation the ball end 35 of the stud 21. Thus, the ball end 35 automatically centers the wedge-like member 37.

A slot 40, extending axially of the stud 21, is provided near one marginal edge of the wedge member 37 being arranged to receive a pin 42 which is pressed into the wall of the housing 11 having a portion extending into the cylindrical bore 14. The contact of the pin 42 with the wedge-like member 37 prevents rotation of the wedge-like member in the socket.

A lower wedge member 45, having a slanted side 46 abutting the slanted side 38 of the wedge member 37, is provided with a recessed portion 47 for receiving a coil spring 48 therein. When the joint of this invention is assembled, the two wedge members 37 and 45 are inserted in the bore 14 after the ball stud and ring 30 are seated on the bearing surface 32. The groove 40 of the wedge member 37 receives the pin 42 and the spring 48 is disposed in the opening 47 of the wedge-like member 45.

A feature of this invention resides in the assembly of the wedge members in the housing so that they will be in their most collapsed or minimum height positions and aligned with the stud axis. This is made possible by means of a drive screw 53 which is screwed into an aperture 54 in the side of the casing 11 with the inner end of the drive screw 53 abutting the edge of the lower wedge member 45. By pushing in on the drive screw 53 the wedge block 45 may be pushed to the right as viewed in Figures 1 and 2, compressing the spring 48 which is disposed therein. When the wedges are in their minimum height position the lower closure plate 18 is positioned against the shoulder 19 of the casing and the lower annular edge of the casing is then peened over the edge of the closure plate 18, as shown in Figure 1.

It will, of course, be understood that the drive screw 53 is backed out partially or even completely as shown in Figure 1 after assembly in which case the spring 48 will push the block 45 toward the left.

It is thus seen that as the frusto-conical or segmental spherical bearing surfaces of the joint assembly begin to wear, the spring 48 will move the lower wedge block to the left causing the upper wedge block to move upwardly against the ball end 35 of the stud 21. Thus the wedge blocks are arranged, through the action of the spring 48, to always urge the bearing surfaces into tight engaging relation.

From the above description it will be understood that there is provided in this invention a stud which is rotatable about a center axis and pivotable on a bearing ring disposed in the housing of the joint assembly. Further there is provided spring urged wedge-like members which upon assembly are put into their minimum height relation and which are arranged to move with a wedging action to urge the bearing surfaces of the joint assembly into bearing relation.

This joint is simple in construction and provides an efficient, economical means for compensating for wear of the bearing surfaces.

It will, of course, be understood that various details of construction may be varied through a wide range without departing from the principles of this invention and it is, therefore, not the purpose to limit the patent granted hereon otherwise than necessitated by the scope of the appended claims.

I claim as my invention:

1. In a joint assembly of the type wherein an open ended housing tiltably supports a joint stud extending outwardly thereof for universal movement by engagement of cooperating bearing surfaces, the improvement whereby a fixed pivot center is provided in the housing for the joint stud which is capable of accommodating wear between the bearing surfaces, which improvement comprises an open ended joint stud housing having a cylindrical chamber adjacent its closed end, a first wedge member having an upper surface forming a pivot center for the joint stud and an angularly inclined lower surface, a second wedge member having an upper angularly inclined surface to drivingly engage said lower surface of said first wedge member and a lower surface engageable with the closed end of said housing, spring means between said housing and said second wedge member to urge said second wedge member into driving engagement with said first wedge member and means between said first wedge member and said housing to align and guide said first wedge member relative to the axis of the joint stud, whereby a fixed pivot center will be provided by said first wedge member despite axial movement of the joint stud.

2. In a joint assembly of the type wherein an open ended housing tiltably supports a joint stud extending outwardly thereof for universal movement by engagement of cooperating bearing surfaces, the improvement whereby a fixed pivot center is provided in the housing for the joint stud which is capable of accommodating wear between the bearing surfaces, which improvement comprises an open ended joint stud housing having a cylindrical chamber adjacent its closed end, a first wedge member having an upper surface forming a pivot center for the joint stud and an angularly inclined lower surface, a second wedge member having an upper angularly inclined surface to drivingly engage said lower surface of said first wedge member and a lower surface engageable with the closed end of said housing, spring means between said housing and said second wedge member to urge said second wedge member into driving engagement with said first wedge member and means between said first wedge member and said housing to align and guide said first wedge member relative to the axis of the joint stud, whereby a fixed pivot center will be provided by said first wedge member despite axial movement of the joint stud, said cylindrical chamber being constructed to provide a spacing dimension between the closed end of said housing and the joint stud to initially accommodate only the minimum height position of said wedges.

3. In a joint assembly of the type wherein an open ended housing tiltably supports a joint stud extending outwardly thereof for universal movement by engagement of cooperating bearing surfaces, the improvement whereby a fixed pivot center is provided in the housing for the joint stud which is capable of accommodating wear between the bearing surfaces, which improvement comprises an open ended joint stud housing having a cylindrical chamber adjacent its closed end, a first wedge member having an upper surface forming a pivot center for the joint stud and an angularly inclined lower surface, a second wedge member having an upper angularly inclined surface to drivingly engage said lower surface of said first wedge member and a lower surface engageable with the closed end of said housing, spring means between said housing and said second wedge member to urge said second wedge member into driving engagement with said first wedge member, means between said first member and said housing to align and guide said first wedge member relative to the axis of the joint stud, whereby a fixed pivot center will be provided by said first wedge member despite axial movement of the joint stud, and a drive screw threadedly engageable with said housing and abuttingly engageable with said second wedge member to selectively urge said second wedge member against the bias of said spring means.

OLIVER. S. FRENCH.

REFERENCES CITED

The following references are of record in the file of this patent:

UNITED STATES PATENTS

| Number | Name | Date |
|---|---|---|
| 1,848,471 | Gebert et al. | Mar. 8, 1932 |
| 1,957,781 | Hufferd | May 8, 1934 |
| 2,074,748 | Hufferd et al. | Mar. 23, 1937 |